United States Patent [19]

Chang

[11] 3,873,384

[45] Mar. 25, 1975

[54] METHOD OF STABILIZING A SILICON BASE MOS DEVICE WITH ZINC

[76] Inventor: Chun-Yen Chang, College of Engineering National Chiao Tung University, Hainchu, Taiwan

[22] Filed: Sept. 8, 1972

[21] Appl. No.: 287,274

Related U.S. Application Data

[62] Division of Ser. No. 30,603, April 21, 1970, abandoned.

[52] U.S. Cl................... 148/188, 148/1.5, 148/186, 148/187, 317/235 R

[51] Int. Cl. ............................................ H01l 7/34

[58] Field of Search ............. 148/188, 186, 1.5, 33, 148/187; 317/235 E, 235 AG

[56] References Cited

UNITED STATES PATENTS 3,402,081 9/1968 Lehman ............................ 148/188

3,485,684 12/1969 Mann et al......................... 148/187

FOREIGN PATENTS OR APPLICATIONS 1,151,499 5/1969 United Kingdom ............... 148/188

OTHER PUBLICATIONS

Chang et al., "Electrical Properties of Diffused Zinc on $SiO_2$-Si MOS Structures," Solid-State Electronics, Vol. 12, pp. 411–415, Pergamon Press, Gt. Brit. (May 1969).

*Primary Examiner*—G. Ozaki

*Attorney, Agent, or Firm*—Shapiro and Shapiro; Rines and Rines

[57] ABSTRACT

A silicon/silicondioxide device, of the MOS type, for example, in which zinc is diffused through the silicon-dioxide layer to the interface between the silicon base and the silicondioxide layer.

3 Claims, No Drawings

METHOD OF STABILIZING A SILICON BASE MOS DEVICE WITH ZINC

This is a division of application Ser. No. 30,603, filed Apr. 21, 1970 now abandoned.

BACKGROUND OF THE INVENTION

1. Field of the Invention

The invention is of the type in which a diode, capacitor, transistor or other device comprises a silicon base and a silicon dioxide layer with a contacting interface between them.

2. Description of the Prior Art

The prior art is represented by diodes, capacitors, transistors, MOS structures and other devices each comprising a silicon base and a silicon dioxide layer. The nearest prior art to the present invention with which the applicant is familiar is disclosed by Nassibian, A. G., "Effect of Diffused Oxygen And Gold On Surface Properties Of Oxidized Silicon," 10 Solid State Electronics 879, Sept., 1967. According to the disclosure of this Nassibian paper, gold is diffused through the silicon dioxide layer to the interface between the silicon base and the silicon dioxide layer.

An object of the present invention is to improve upon devices of the above described character, and, more particularly, to increase their stability.

SUMMARY OF THE INVENTION

According to the invention, in a device comprising a silicon base and a silicon dioxide layer disposed in contact with each other, negative zinc ions are diffused through the silicon dioxide layer to the interface between the base and the layer. These negative zinc ions neutralize positive or mobile positive ions in the silicon base. The stability of the silicon dioxide layer becomes thus increased.

DESCRIPTION OF THE PREFERRED EMBODIMENT OF THE INVENTION

The invention will be explained in connection with the now well known MOS type of device described, for example, by Terman, L. M., "An Investigation Of Surface States At A Silicon-Silicon Oxide Interface Employing Metal-Oxide Silicon Diodes," 5 Solid State Electronics 275, September-October, 1962. This device comprises a semi-conductive silicon base one face of which is in contact with one face of a non-conductive silicon dioxide layer. The other face of the silicon dioxide layer is provided with a small conductive metal dot against which varying pressures may be applied. These devices have become known as $SiO_2$-Si MOS structures. The invention is equally applicable, however, to other types of devices embodying the silicon base and the silicon dioxide layer.

The capacity-voltage or C-V characteristic of devices of the above-described character lacks stability.

According to the preferred embodiment of the invention that is herein described, zinc is diffused into the oxidized silicon dioxide layer. As described in my paper (cited infra), during the investigation leading to the discoveries underlying the present invention, the silicon wafer was first oxidized to a thickness of 2,000 A, and then was cut into three pieces. Aluminum was deposited on one of these three pieces in a vacuum to produce a MOS structure. Zinc was deposited on a second of the three pieces in a vacuum. The zinc was then caused to become diffused into the second piece by high temperature diffusion. The first piece will be referred to hereinafter as the oxidized sample, and the second piece as the zinc diffused sample. The third piece was placed in the vacuum without any zinc coating thereon. The third piece will be referred to as the control sample. As set forth in my aforesaid paper, the semi-conductor substrates used for making MOS structures were <111> oriented, 12Ω-cm *p*-type and 1Ω-cm n-type silicon wafers. The experimental procedures were as follows:

i. The silicon substrate was first etched and cleaned.
ii. The sample was thermally oxidized to form a silicon dioxide layer of 2,000 A. The oxidation temperature was varied between 900° and 1,200°C.
iii. Zinc film of 1000 A thickness was deposited on the sample in a vacuum system.
iv. The sample was put into a drive-in furnace at 800°C under dry nitrogen for 30 minutes. A control sample which had not been coated with zinc was put into the furnace simultaneously. In order to study the temperature effect, the zinc drive-in temperatures was varied from 600 to 1,000°C.
v. 5000 A aluminum was deposited in a vacuum system on the oxidized samples, the control samples, and the zinc diffused samples.
vi. Finally metal field plates of area $1.6 \times 10^{-3}$ cm$^2$ were defined by the use of photoresist process.

A resulting shift of the C-V characteristic curves was thereupon discovered to occur for p-type and n-type samples along the voltage axis for various oxidation temperatures. This is illustrated by FIG. 1 of my published paper subtitled, "Electrical Properties Of Diffused Zinc On $SiO_2$-Si MOS Structures," 12 Solid State Electronics 411 (May, 1969,), which paper is incorporated herein by reference. As shown by this FIG. 1, the C-F curves corresponding to both the control sample and the zinc diffused sample become shifted in the positive-voltage direction. As likewise shown by the said FIG. 1, the values of the normalized $C_{min}$ are also changed by the oxidation and zinc diffusion processes. For n-type samples, the values for the control samples are smaller than those of the oxidized samples, while zinc diffused samples have the lowest values. For p-type samples, the situation is inverted.

For a given oxidation temperature, the measured $C_{min}$ increased with increasing zinc drive-in temperature for p-type samples, and decreases for n-type samples, as shown in FIG. 2 of my said article.

As described in my paper, the capacitance measurements of the zinc diffused samples, after more than three months of room temperature aging, show that there are virtually no changes in comparison with those measured immediately after the device was manufactured. By contrast, the oxidized and the control samples have had considerable change.

It appears that zinc behaves as a negative space charge in $SiO_2$ or at the $SiO_2$-Si interface, thus causing the C-V curve to shift in the positive voltage direction. Low-frequency C-V characteristics are observed in FIG. 1(*d*) of my said article, with 900°C oxidation temperature; this is believed to be due to minority carrier supply from the strong inversion layer outside the field plate.

The acceptor behavior of zinc's shallow level at 0.092eV above the top of the valence band, as explained in my said paper, will change the value of $C_{min}$.

In the said FIG. 1, the value of $C_{min}$ is shown decreased for n-type samples and reversed for p-type samples.

During oxidation, donor-like oxygen is doped into the silicon surface and into the $SiO_2$-Si interface; therefore, all the C-V curves are present at the far left in the said FIG. 1, and the $C_{min}$ is located at the highest level with the n-type, and at the lowest level with the p-type, after oxidation.

For control samples which have been annealed, the oxygen content is reduced. It is conceivable that the interface structure is more ordered, which presumably causes a reduction of the space charge in the $SiO_2$ and the $SiO_2$-Si interface; and thus increases the value of $C_{min}$ for the p-type, and decreases that for the n-type samples. This effect is shown in the said FIG. 1.

It is interesting to note that the diffusion of zinc into the MOS structures make the device more stable than the control samples and the oxidized samples. It is conceivable that negatively charged zinc atoms in the oxide layer can combine with the positive ions and thus become neutral. The effect due to ion drift becomes thereby reduced.

It will be observed that the acceptor-type zinc atoms at the $SiO_2$-Si interface can induce a positive space charge in silicon. On the other hand, at high temperatures, Zinc atoms can diffuse into the silicon substrate also, and thus increase the acceptor concentration of the semiconductor. It may be assumed that zinc behaves as a negative space charge in the $SiO_2$ layer, thus neutralizing a positively charged ion, such as a sodium ion.

The use of zinc, as above described, has many advantages over a similar use of gold. Zinc lends itself to diffusion over a very wide temperature range, say, 1,000° C. to 1,400° C., in contrast to the corresponding steep range of temperature that one obtains with the use of gold. Zinc, moreover, lends itself to greater convenience with respect to the control of the amount and the depth of its penetration into the silicon and the silicon dioxide layer. It is easier, moreover, to form a zinc film by evaporation, its melting point being only 419.6°C. High-purity zinc metal, furthermore, is more easily procurable than high-purity gold. A further advantage of the use of negative zinc ions resides in that, serving as negatively charged ions penetrating into the $SiO_2$-Si interface, they will control the turn-on voltage of an MOS device during fabrication.

Modifications will occur to persons skilled in the art and all such are considered to fall within the spirit and scope of the present invention, as defined in the appended claims.

What is claimed is:

1. A method of manufacturing a semi-conductor device having improved stability, which comprises providing a base of semi-conductive silicon material, forming a silicon dioxide layer on said base, depositing high-purity zinc metal upon said layer, and diffusing negative zinc ions into said layer by raising the temperature thereof to the order of 1,000°C.

2. A method in accordance with claim 1, wherein said layer contains positive ions which are neutralized by said negative ions.

3. A method in accordance with claim 1, wherein the zinc ions are diffused into the interface of said base and said layer.

* * * * *